United States Patent
Bennett

(10) Patent No.: US 7,715,432 B2
(45) Date of Patent: May 11, 2010

(54) PRIMARY PROTOCOL STACK HAVING A SECONDARY PROTOCOL STACK ENTRY POINT

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 874 days.

(21) Appl. No.: 11/506,262

(22) Filed: Aug. 18, 2006

(65) Prior Publication Data

US 2007/0110436 A1    May 17, 2007

Related U.S. Application Data

(63) Continuation-in-part of application No. 11/365,102, filed on Mar. 1, 2006, now Pat. No. 7,626,994, and a continuation-in-part of application No. 11/394,253, filed on Mar. 30, 2006, and a continuation-in-part of application No. 11/418,644, filed on May 5, 2006, and a continuation-in-part of application No. 11/448,240, filed on Jun. 6, 2006.

(60) Provisional application No. 60/736,889, filed on Nov. 14, 2005.

(51) Int. Cl.
*H04J 1/16* (2006.01)
*H04L 12/56* (2006.01)

(52) U.S. Cl. .................. 370/466; 370/216; 370/328; 370/419

(58) Field of Classification Search ................. 370/419, 370/216, 466, 328
See application file for complete search history.

(56) References Cited

U.S. PATENT DOCUMENTS 7,426,636 B1 *   9/2008   McGrew et al. ............. 713/160

(Continued)

FOREIGN PATENT DOCUMENTS

EP          1089495 A2     4/2001

(Continued)

OTHER PUBLICATIONS

Bernhard Walke et al; "Architecture Proposal for the Winner Radio Access Network and Protocol"; Internet Citation, Jun. 2004.

(Continued)

*Primary Examiner*—John Pezzlo
(74) *Attorney, Agent, or Firm*—Garlick Harrison & Markison; Bruce E. Garlick

(57) ABSTRACT

A primary multi-layer protocol stack that allows a secondary multi-layer protocol stack to communicatively couple into one or more of its layers. End point device circuitry implements both the primary and secondary protocol stacks. A communication application running on the end point device initiates interaction, e.g., a session, via a primary radio and primary intermediate protocol stack layers. Based on a change in communication characteristics, for example, an operation is invoked to bridge between one of the intermediate protocol stack layers of the primary stack to one from the secondary stack. Such bridging establishes a secondary pathway via the secondary radio. The primary and secondary radios may support the same or differing protocols. To avoid having to fully reestablish a session, at least one session parameter is carried forward through the bridge. The bridge may have multiple entry points in and out of both protocol stacks and operate as two half-duplex bridges.

25 Claims, 8 Drawing Sheets

U.S. PATENT DOCUMENTS

| | | | |
|---|---|---|---|
| 7,493,122 B2* | 2/2009 | Farley et al. | 455/453 |
| 2002/0160771 A1 | 10/2002 | Massie | |
| 2002/0194385 A1 | 12/2002 | Linder | |
| 2003/0058832 A1 | 3/2003 | Knauerhase | |
| 2004/0097263 A1 | 5/2004 | Katayama | |
| 2004/0151136 A1* | 8/2004 | Gage | 370/328 |
| 2004/0170181 A1 | 9/2004 | Bogdon et al. | |
| 2005/0070326 A1 | 3/2005 | Morton | |
| 2005/0096012 A1* | 5/2005 | Borella et al. | 455/411 |
| 2005/0152401 A1* | 7/2005 | Wiljakka et al. | 370/474 |
| 2006/0023676 A1 | 2/2006 | Whitmore et al. | |
| 2006/0062206 A1 | 3/2006 | Krishnaswamy | |
| 2007/0091904 A1* | 4/2007 | Siqueira et al. | 370/401 |
| 2007/0115987 A1* | 5/2007 | Hoekstra | 370/392 |
| 2007/0142098 A1* | 6/2007 | Behzad et al. | 455/574 |
| 2007/0177495 A1* | 8/2007 | Ametsitsi | 370/208 |

FOREIGN PATENT DOCUMENTS

| | | |
|---|---|---|
| EP | 1337076 A1 | 8/2003 |
| EP | 1517575 A | 3/2005 |
| EP | 1 587 262 A | 10/2005 |
| EP | 1589781 A | 10/2005 |
| EP | 1650904 A1 | 4/2006 |
| WO | 0163946 A | 8/2001 |
| WO | WO 03/065654 A | 8/2003 |
| WO | WO 2005/008968 A | 1/2005 |

OTHER PUBLICATIONS

Tourrilhes J. et al.: "P-handoff: A Protocol for Fine Grained Peer-to-Peer Vertical Handoff" Personal, Indoor and Mobile Radio Communication, 2002. The 13th IEEE International Symposium on Sep. 15-18, 2002 Piscataway, NJ.

* cited by examiner

PRIMARY PROTOCOL STACK HAVING A SECONDARY PROTOCOL STACK ENTRY POINT

CROSS-REFERENCE TO RELATED APPLICATIONS/INCORPORATION BY REFERENCE

The present application is a continuation-in-part of:

U.S. Utility application Ser. No. 11/365,102, filed Mar. 1, 2006 now U.S. Pat. No. 7,626,994 and entitled "MULTIPLE NODE APPLICATIONS COOPERATIVELY MANAGING A PLURALITY OF PACKET SWITCHED NETWORK PATHWAYS,"

U.S. Utility application Ser. No. 11/394,253, filed Mar. 30, 2006 and entitled "NETWORK NODES COOPERATIVELY ROUTING TRAFFIC FLOW AMONGST WIRED AND WIRELESS NETWORK,"

U.S. Utility application Ser. No. 11/418,644, filed May 5, 2006 and entitled "PATHWAY PARAMETER EXCHANGE BETWEEN ACCESS NETWORKS OF DIFFERING TYPES,"

U.S. Utility application Ser. No. 11/448,240, filed Jun. 6, 2006 and entitled "ACCESS POINT SUPPORTING DIRECT AND INDIRECT DOWNSTREAM DELIVERY BASED ON COMMUNICATION CHARACTERISTICS," all of which are incorporated by reference herein in their entirety for all purposes; and U.S. Utility application Ser. No. 11/494,680, filed Jul. 27, 2006 and entitled "INDIRECT COMMAND PATHWAYS BETWEEN AN END POINT DEVICE AND A TARGET ACCESS POINT VIA A SECONDARY ACCESS POINT, "all of which are incorporated by reference herein in their entirety for all purposes.

The present application claims priority to U.S. provisional application Ser. No. 60/736,889, filed Nov. 14, 2005, which is incorporated herein by reference for all purposes.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

1. Field of the Invention

Various aspects of present invention relate to flow of data packet through layers of two communicatively incompatible protocol stacks implemented within an end point device.

2. Description of the Related Art

A notebook, a personal computer, a video game box, a personal digital assistant, a headset, a phone, a set top box, servers and many other types of end point devices (EPDs) may be communicatively connected to more than one packet switched data networks. These packet switched data networks may operate pursuant to communicatively incompatible protocols. Typical examples of the packet switched data network include EDGE (Enhanced Data Rates for GSM Evolution) networks, GSM (Global System for Mobile Communications) networks, CDMA (Code Division Multiple Access) networks, IEEE (Institute of Electrical and Electronics Engineers) 802.11 networks, Bluetooth, WiMax networks, Internet, Intranet, satellite networks, etc.

A typical EPD having two communication interfaces may be adapted to operate pursuant to two communicatively incompatible protocols. The two protocols follow multi-layer stack architecture. First of the two communication interfaces uses first of the two protocols for packet data exchange with a second EPD via one or more of the packet switched data networks. Second of the two communication interfaces uses second of the two protocols for packet data exchange with the second EPD via one or more of the packet switched data networks. The EPD, already using the first communication interface for packet data exchange with the second EPD may decide to use the second communication interface instead of the first communication interface for packet data exchange with the second EPD. The EPD needs to re-establish communication session fully through all layers of the second protocol stack in such a case. Re-establishment of the communication session calls for large volume of information exchange between layers of the second protocol stack and is hence time-consuming.

Further limitations and disadvantages of conventional and traditional approaches will become apparent to one of ordinary skill in the art through comparison of such systems with various aspects of the present invention.

BRIEF SUMMARY OF THE INVENTION

A protocol stack that allows a foreign protocol stack to communicatively couple into it thereby allowing establishment of a communication session partly in the protocol stack and partly in the foreign protocol stack, substantially as shown in and/or described in connection with at least one of the figures, as set forth more completely in the claims. An end point device implements both the protocol stack and the foreign protocol stack within it. These and other advantages, aspects and novel features of the present invention, as well details of illustrative aspects thereof, will be more fully understood from the following description and drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
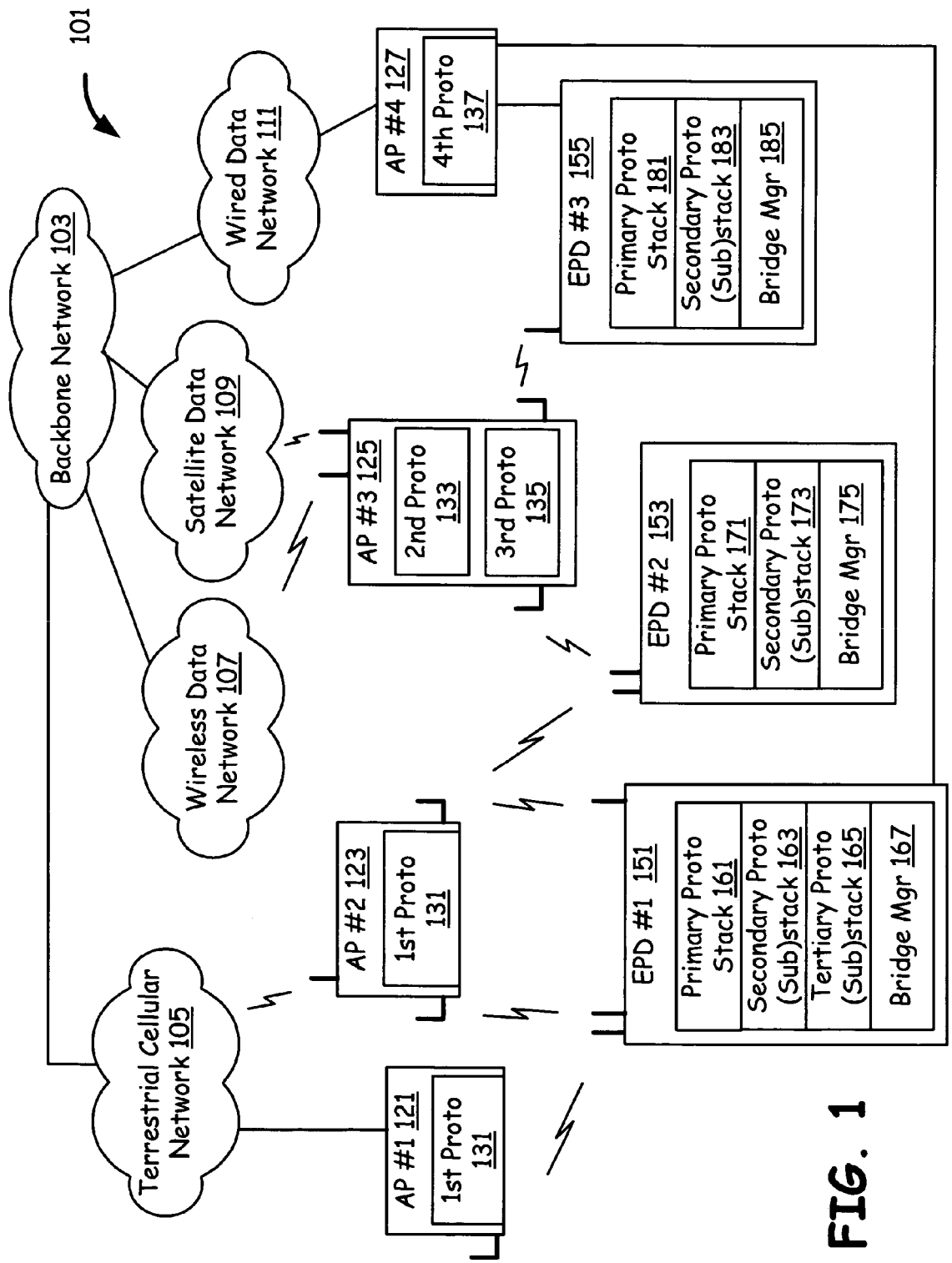
FIG. 1 is a schematic block diagram of a communication network of end point devices and access points, wherein each of the end point devices employs a primary protocol stack that has an entry point for a secondary protocol stack, the end point devices support data communication with one of the access points using the first protocol and another of the access points using the second protocol in accordance with the present invention.

FIG. 1 is a schematic block diagram of a communication network 101 of end point devices 151, 153 and 155 and access points, 121, 123, 125 and 127 wherein each of the end point devices 151, 153 and 155 employs a primary protocol stack that has an entry point for a secondary protocol stack, the end point devices support data communication with one of the access points using the first protocol and another of the access points using the second protocol. The EPDs (end point devices) 151, 153 and 155 may be a notebook, a video game box, a server, a personal computer (PC), a phone, a personal digital assistant (PDA) etc. The first AP 121 and the second AP 123 are communicatively coupled to a terrestrial cellular network 105 that may typically be a CDMA, a HSDPA, a GSM, an EDGE, a GPRS network etc. The third AP 125 is communicatively coupled to a wireless data network 107 that may be a WiFi network, a WiMax network, a Bluetooth network etc. and in addition to a satellite data network 109. The fourth AP 127 is communicatively associated with a wired data network 111 that is for e.g., a PSTN network, a cable data network, a fiber optic data network. Each of the EPDs 151, 153 and 155 is adapted to exchange data with more than one of the APs 121, 123, 125 and 127. Each of the EPDs 151, 153 and 155 support data communication with respective associated APs using more than one data communication protocols. As an example the EPD 151 exchanges data with the first AP 121 using a first protocol 131, with the third AP 125 using a second protocol 133, and with the fourth AP 127 using a fourth protocol 137. The first protocol 131 is CDMA protocol if the cellular network 105 is a CDMA network. Similarly the second protocol 133 and the fourth protocol 137 are protocols that the APs 125 and 127 respectively use to communicate with the wireless data network 107 and the wired data network 111. The data comprises real time and/or archived information such as a video, an audio, a video game, a movie, a television program, a music show, a picture and any of a variety of multimedia information. An AP is a transceiver that exchanges data with one or more associated downstream EPDs (151, 153 and 155) and in addition exchanges data with one or more upstream data networks (105, 107, 109 and 111). The upstream data networks 105, 107, 109 and 111 are communicatively coupled via a backbone network 103.

As a way of example the first EPD 151 is adapted to operate pursuant to three protocols, the first protocol 131, the second protocol 133 and the fourth protocol 137. The three protocols may be communicatively incompatible. Each of the three protocols employs stack architecture. A communication application running on the first EPD 151 (and on any of the EPDs 151, 153 and 155) is uppermost layer i.e., layer 7 or application layer of the stack architecture. The communication application may be for e.g., a HTTP browsing application, an archived multimedia file downloading application, a video and/or audio streaming application, an Internet telephony application, a telephone call, a video gaming etc. Communication interface(s) of the first EPD 151 is lowermost layer, i.e., layer 1 or physical layer (PHY layer) of the stack architecture. For example a voice call is going on between the first EPD 151 and the third EPD 155. The first EPD 151 sends and receives voice data to the first AP 121 using the first protocol 131. A primary protocol stack 161 refers to the stack architecture of the first protocol 131. The voice call is running on layer 7 of the primary protocol stack 161 and a first communication interface (not shown here) via which the first EPD 151 interacts with the first AP 121 is layer 1 of the primary protocol stack 161.

Similarly a secondary protocol stack 163 refers to the stack architecture of the second protocol 133 and a tertiary protocol stack 165 refers to the stack architecture of the fourth protocol 137. The third EPD 155 uses the fourth protocol 137 to send and receive voice data from the fourth AP 127. Primary protocol stack architecture 181 implemented in the third EPD 155 refers to the stack architecture of the fourth protocol 137. The first EPD 151 sets up a first data pathway with the third EPD 155. The voice call i.e., the voice data is carried over the first data pathway. The first data pathway passes through all layers of the primary protocol stack 161, the first communication interface (not shown here) of the first EPD 151 (layer 1 of the protocol stack 161), the first AP 121, the terrestrial cellular network 105, the backbone network 103, the wired data network 111, the fourth AP 127, the third EPD 155 and all layers of the protocol stack 181. The voice data generated by the voice call application at the first EPD 151 is encrypted independently by each of the layers of the primary protocol stack 161 before being transmitted to the first AP 121 via the first communication interface (not shown here) of the first EPD 151. The encryption is as per the first protocol 131.

The first EPD 151 decides to send the voice data to the third EPD 155 via a second data pathway instead of sending it via the first data pathway. The decision may be taken in response to an increase in traffic load on the first data pathway, a detachment from the first AP 121, a higher data rate requirement, support of a better QOS on the second data pathway compared to the first data pathway, an unacceptable delay on the first data pathway etc. The second data pathway, as an example, passes through the third AP 125, the wireless data network 107, the backbone network 103, the wired data network 151, the fourth AP 127, the third EPD 155 and all layers of the protocol stack 181. In one embodiment the first EPD 151 is directed by some other node of the communication network 101 to use the second data pathway for carrying the voice data.

The first EPD 151 is communicatively connected to the third AP 125 via a second communication interface (not shown here). The second communication interface is layer 1 or physical layer of the secondary protocol stack 163. The first EPD 151 uses the second protocol 133 for data communication with the third AP 125. The voice data generated by the voice call application running on the first EPD 151 need to be encrypted as per the second protocol before being sent out via the second communication interface (not shown here) of the first EPD 151. Decision taken by the first EPD 151 to send the voice data to the third EPD 155 via the second data pathway instead of sending it via the first data pathway calls for termination of the voice call session through the primary protocol stack 161 and independent establishment of the voice call session through all layers of the secondary protocol stack 163.

A bridge manager module 167 of the first EPD 151 responds to above mentioned situation by setting up a bridge between a layer of the primary protocol stack 161 and a corresponding layer of the secondary protocol stack 163. As an example and without limitation, the bridge manager module 167 sets up a bridge between layer 4 i.e., transport layer of the primary protocol stack 161 and layer 4 of the secondary protocol stack 163. The layer 4 of the primary protocol stack 161 is henceforth communicatively coupled to the layer 4 of the secondary protocol stack 163. The bridge manager module 167 directs the voice data generated by the voice call application running on the layer 7 of the primary protocol stack 161 to pass through layer 6, layer 5 and layer 4 of the primary protocol stack 161, the bridge, layer 4, layer 3 and layer 2 of the secondary protocol stack 163, the second communication interface of the first EPD 151, i.e., the layer 1 of the secondary protocol stack 163. The voice data is next transmitted by the second communication interface to the third AP 125 from where it ultimately reaches the third EPD 155. The second data pathway thus comprises layer 7, layer 6, layer 5 and layer 4 of the primary protocol stack 161, the bridge, layer 4, layer 3, layer 2 and layer 1 of the secondary protocol stack 163, the third AP 125, the wireless data network 107, the backbone network 103, the wired data network 151, the fourth AP 127, the third EPD 155 and all layers of the protocol stack 181.

The bridge manager module 167 while switching the voice call session from the first data pathway to the second data pathway carries forward at least one session parameter corresponding to the voice call session via the first pathway to the second data pathway. The at least one session parameter, for example, is an encryption parameter, a login parameter, a billing parameter, an association parameter etc.

In one embodiment layer 5, layer 6, and layer 7 of the secondary protocol stack 163, i.e., layers above the bridge in the secondary protocol stack 163 are not made aware of the bridging. The bridging between the layer 4 of the primary protocol stack 161 and the layer 4 of the secondary protocol stack 163 does not require reestablishment of the voice call session through all layers of the secondary protocol stack 163. The layer 4 of the primary and the layer 4 of the secondary protocol stacks (161 and 163) i.e., participating layers exchange keys and/or parameters necessary for flow of the data (i.e., the voice data) via a few of layers of the primary protocol stack 161 that conforms to the first protocol 131 and a few of layers of the secondary protocol stack 163 that conforms to the second protocol 133. The first protocol 131 and the second protocol 133 may be communicatively incompatible.

In another embodiment the bridge is formed between layer 5 i.e., session layer of the primary protocol stack 161 and layer 5 (i.e., session layer) of the secondary protocol stack 163. The bridge manager module 167 is adapted to form a bridge between any of the layers 2, 3, 4, 5 of the primary protocol stack 161 and corresponding layers of the secondary protocol stack 163. The bridge manager module 167 in yet another embodiment informs layers of the secondary protocol stack 163 above the participating layer (i.e., the layer that gets communicatively coupled with the corresponding layer of the first protocol stack 161) about the bridging.

In the another embodiment the first EPD 151 implements all layers of the primary. protocol stack 161 and only the participating layer and layers below the participating layer from the secondary protocol stack 181. In other words the first EPD 151 implements all layers of the primary protocol stack 161 and a portion of the secondary protocol stack 163 i.e., a secondary protocol sub-stack. The bridge manager module 167 may support half-duplex and/or full-duplex data exchange via the established bridge. The bridge manager module 167 may alternately direct transmission of the voice data via the bridge i.e., the second data pathway and reception of data from the third EPD 155 via the first data pathway.

The bridge manager module 167 in some embodiment may direct the voice data via the first data pathway and command and/or supplementary data via the second data pathway. As an example the bridge manager module 167 directs the voice data (i.e., data generated by communication application running on the layer 7 of the primary protocol stack 161) to be transmitted via the first communication interface (not shown here) of the first EPD 151 and directs command data meant for the third EPD 155 to be transmitted simultaneously via the second communication interface (not shown here) of the first EPD 151. As an example, a bridge is invoked between layer 3 of the primary protocol stack 161 and layer 3 of the secondary protocol stack 163. The voice data flows through all layers of the primary protocol stack 161 before being sent out to the first AP 121 via the first communication interface (not shown here) of the first EPD 151 i.e., layer 1 or physical layer of the primary protocol stack 161 while the command data flows via layers 7, 6, 5, 4 and 3 of the primary protocol stack 161, the bridge and layers 3 and 2 of the secondary protocol stack 163 before being sent out to the third AP 125 via the second communication interface (not shown here) of the first EPD 151 i.e., layer 1 or physical layer of the secondary protocol stack 163.

In a variant of the above invention, each of the layers of the primary protocol stack 161 as well each of the layers of the secondary protocol stack 163 comprises a layer manager. The layer manager corresponding to, for example, layer 5 of the primary protocol stack 161 decides independently of other layer managers of the primary protocol stack 161 whether it will invoke a bridge with layer 5 of the secondary protocol stack 163. Once decided the layer 5 of the primary protocol stack 161 attempts to set up the bridge with the layer 5 of the secondary protocol stack 163. The layers 5 of the primary and the secondary protocol stacks may choose to take the decision of invoking the bridge between them jointly.

The first EPD 151 in addition supports the fourth protocol 137 and implements full and/or a portion of the tertiary protocol stack 165. The bridge manager module 167 in addition supports bridging between two corresponding layers of the primary protocol stack 161 and the tertiary protocol stack 165. Typically the two corresponding layers between which a bridge is established are layers 6, layers 5, layers 4, and layers 3 of the primary protocol stack 161 and the tertiary protocol stack 165.

Figure 2:
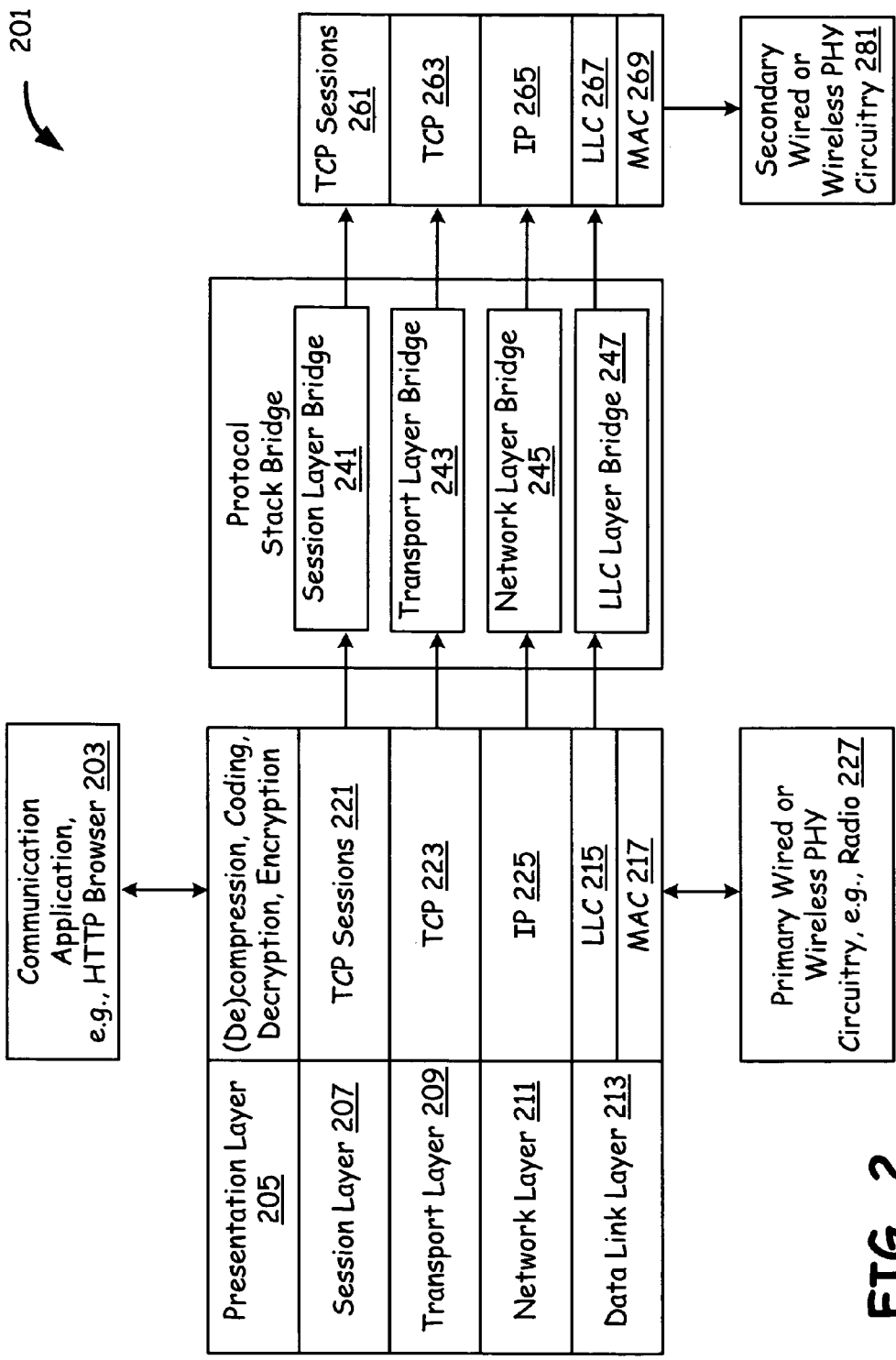
FIG. 2 is a schematic block diagram illustrating an end point device of FIG. 1, the end point device supporting half-duplex bridging between a primary protocol stack supporting a primary radio and a secondary protocol stack supporting a secondary radio.

FIG. 2 is a schematic block diagram illustrating an end point device of FIG. 1, the end point device 201 supporting half-duplex bridging between a primary protocol stack supporting a primary radio 227 and a secondary protocol stack supporting a secondary radio 281. The primary protocol stack comprises seven layers, namely a first application layer 203, a first presentation layer 205, a first session layer 207, a first transport layer 209, a first network layer 211, a first data link layer 213, and a first physical layer 227. The first data link layer 213 comprises a first logical link control layer 215 and a first medium access control layer 217. The primary radio 227 is part of the first physical layer 227. The primary radio 227 and the first physical layer 227 refer to the same entity. The secondary protocol stack comprises a second session layer 261, a second transport layer 263, a second network layer 265, a second logical link control layer 267, and a second medium access control layer 269. The secondary radio 281 is a second physical layer of the secondary protocol stack.

A session layer bridge 241 communicatively couples the first session layer 207 with the second session layer 261 in a single direction, i.e., a half-duplex communication link is established between the first session layer 207 of the primary protocol stack and the second session layer 261 of the secondary protocol stack. Similarly a transport layer bridge 243 sets up a half-duplex communication path between the first transport layer 209 and the second transport layer 263. A network layer bridge 245 and a logical link control (LLC) layer bridge 247 communicatively couples network layers and LLC layers of the primary protocol stack with those of the secondary protocol stack. The primary radio 227 is a wireless radio if the primary protocol stack corresponds to a wireless protocol, for example, WiFi, WiMax, Bluetooth, CDMA, GSM, GPRS, EDGE, WCDMA etc. The primary radio 227 is a wired radio if the primary protocol stack corresponds to a wired protocol, for example, a cable data protocol, a fiber data protocol etc. The secondary radio 281 may similarly be a wired or a wireless radio depending on type of the secondary protocol. The primary protocol and the secondary protocol are communicatively incompatible in one embodiment.

The EPD 201 is communicatively coupled to a plurality of EPDs via a packet switched backbone network. Having the primary radio 227 and the secondary radio 281, the EPD 201 is capable of exchanging data packets with two different EPDs simultaneously using the first protocol and the second protocol respectively. The EPD 201 selects to use the primary radio 227 to transmit data packets generated by a communication application running on the EPD 201 and also selects to use the primary radio 227 to receive data packets required by the communication application by default. The radio 227 is hence referred to as the primary radio. The EPD 201 uses the secondary radio 281 for packet data communication under special circumstances, for example, to send supplementary information, command data, test data etc. to the backbone network and/or another EPD, to send the data packets generated by the communication application if load on the primary radio 227 exceeds a threshold, the primary radio 227 goes down, pathway via the primary radio 227 fails to support required quality of service etc.

A plurality of bridge manager modules, each corresponding to one of the layer bridges 241, 243, 245 and 247 independently and/or in cooperatively decide whether a bridge is to be invoked between two communicatively coupled layers of the primary protocol stack and the secondary protocol stack and if so, then which one of the layer bridges 241, 243, 245 and 247. Only one of the layer bridges 241, 243, 245 and 247 can be operative at a given instant of time. Each of the plurality of bridge manager modules collect information from its immediate below layer and take the decision of invoking the bridge based on the collected information.

As an example the bridge manager module corresponding to the session layer bridge 241 collects information from the first MAC layer 217 and the primary radio 227 and decides to invoke the session layer bridge 241 based on the collected information. The collected information may typically comprise load on the primary radio 227, queue length corresponding to data packets awaiting transmission at the primary radio 227, link quality of communication pathway to which the primary radio 227 is coupled etc. The bridge manager module corresponding to the session layer bridge 241 in one embodiment is communicatively coupled to only the first session layer 207. In such a case the bridge manager module corresponding to the session layer bridge 241 collects the information via the first transport layer 209, the first network layer 211, and the first LLC layer 215. Once the session layer bridge 241 is invoked, the bridge manager module corresponding to the session layer bridge 241 informs remaining of the plurality of bridge manager modules about the decision and subsequently directs the data packets generated by a communication application i.e., the first application layer of the primary protocol stack to pass through the session layer bridge 241. Thus the data packets travel down through the first presentation layer 205 and the first session layer 207 to the session layer bridge 241. From here the data packets travel down the second session layer 261, the second transport layer 263, the second network layer 265, the second LLC layer 267, and the second MAC layer 269 and finally reach the secondary radio 281. The secondary radio 281 transmits the data packets to destination node. The bridge manager module corresponding to the session layer bridge 241 ensures that a session parameter corresponding to ongoing communication session that uses the primary radio 227 is maintained when the communication session is switched to the secondary radio 281. The session parameter, for example, is an encryption parameter, a login parameter, a billing parameter, an association parameter etc.

The data packets, upon establishment of the session layer bridge 241 between session layers of two protocol stacks, passes through layers of the primary protocol stack that are above and including the first session layer 207, the session layer bridge 241 and layers of the secondary protocol stack that are below and including the second session layer 261. Once the session layer bridge 241 is invoked, the first session layer 207 and the second session layer 261 exchanges session information, such as, login information etc. between them. The session information is needed by the second session layer 261 to support packet data communication via a part of the secondary protocol stack. Invoking the session layer bridge 241 saves the EPD 201 from re-establishment of the communication session involving all layers of the secondary protocol stack. Re-establishment of the communication session is typically time-consuming. The bridge manager module corresponding to the session layer bridge 241 may choose not to inform layers above the second session layer 261 of the secondary protocol stack about packet data communication via the session layer bridge 241. The EPD 201 may choose not to implement the layers above the second session layer 261 in the EPD circuitry. In such a case the secondary protocol stack (i.e., sub-stack) is devoid of an application layer and either of the bridges 241, 243, 245 and 247 is invoked whenever the EPD 201 decides to use the secondary radio 281 for packet data communication. Similarly if the transport layer bridge 243 is invoked then the first transport layer 209 and the second transport layer 263 exchanges transport layer information, such as, parameters associated with TCP, TCP window length etc. between them.

The EPD 201 instead of having the plurality of bridge manager modules, each corresponding to one of the layer bridges 241, 243, 245 and 247, in another embodiment, has a single bridge manger module that decides and controls bridging between communicatively coupled layers of the primary protocol stack and the secondary protocol stack. The single bridge manger module and/or the plurality of bridge manager modules, as the case may be, in yet another embodiment directs simultaneous maintenance of a primary data flow path from the communication application 203 to the primary radio 227 via all layers of the primary protocol stack and a secondary data flow path from the communication application 203 to the secondary radio 281 via an invoked bridge. The primary data flow path carries a portion of the data packets and the secondary data flow path carries remaining portion of the data packets. An above mentioned situation typically arises when traffic load is divided between the primary radio 227 and the secondary radio 281 to balance load in the pathways via the primary radio 227 and the secondary radio 281 to the backbone network (not shown here).

Figure 3:
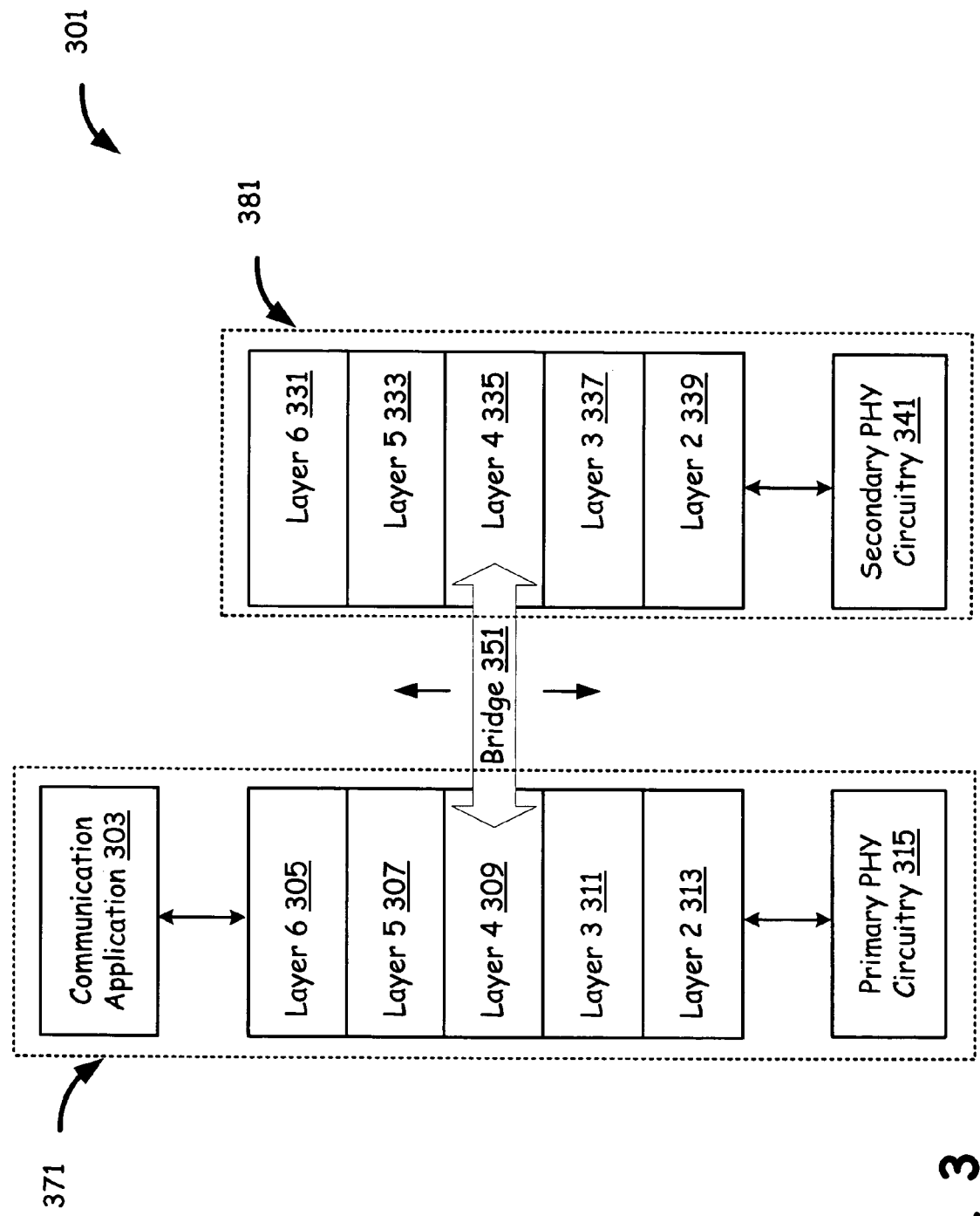
FIG. 3 is a schematic block diagram illustrating an end point device of FIG. 1, the end point device supporting full-duplex bridging between a primary protocol stack supporting a primary radio and a secondary protocol stack supporting a secondary radio.

FIG. 3 is a schematic block diagram illustrating an end point device of FIG. 1, the end point device 301 supporting full-duplex bridging between a primary protocol stack 371 supporting a primary radio 315 and a secondary protocol stack 381 supporting a secondary radio 341. The EPD 301 is adapted to support packet data communication via the primary radio 315 and via the secondary radio 341 simultaneously. In other words the EPD 301 supports the primary protocol as well the secondary protocol for packet data communication with any two of a variety of nodes, such as, an access point, a router, a bridge, another EPD etc. simultaneously. Each of the primary protocol and the secondary protocol supports 7 layer protocol stack architecture. The primary protocol stack 371 is so called because the EPD 301 uses the primary protocol to support a communication application running on the EPD 301 by default. The EPD 301 uses the secondary protocol to support the communication application if the primary radio 315 associated with the primary protocol stack 371 goes to "sleep mode" and/or inoperative state and/or the EPD 301 decides not to use the primary radio 315 under some special circumstances. If a second communication application runs on the EPD 301 then the EPD 301 is left with no choice but to use the secondary protocol to support the second communication application.

As a way of example a communication application such as Internet telephony is running on the EPD 301. The EPD 301 uses the primary protocol, as explained earlier, to support the Internet telephony application. The primary protocol stack 371 comprises seven layers, namely layer 7, 303, layer 6, 305, layer 5, 307, layer 4, 309, layer 3, 311, layer 2, 313 and a layer 1, 315. The layer 7, 303 is the Internet telephony application and the layer 1, 315 is the primary radio. The EPD 301 directs data packets generated by and/or destined for the Internet telephony application 303 to pass through all layers (305, 307, 309, 311, 313, and 315) of the primary protocol stack 371. The layers 305, 307, 309, 311, 313 and 315 apply encoding or decoding to the data packets as they travel via the layers. The primary protocol stack 371 supports full duplex packet data communication via the primary radio 315. The EPD 301 is communicatively connected to, for example and without limitation, to another EPD on which another Internet telephony application is running via a primary pathway. The primary pathway in this example comprises the primary radio or primary physical circuitry 315.

The EPD 301 at an instant of time decides to connect to the another EPD via the secondary radio or secondary physical circuitry 341. A pathway to the another EPD via the secondary radio 341 is referred to as a secondary pathway. The EPD 301 is prompted to switch communication from the primary pathway to the secondary pathway typically, when the secondary pathway offers a better QOS, less delay, higher data rate, less interference, more security etc. in comparison to the primary pathway. The EPD 301 may decide to use the secondary pathway for maintaining the Internet telephony call with the another EPD when load on the primary pathway exceeds a predefined limit. The EPD 301 typically has to establish the Internet telephony session through the secondary protocol stack 381. Such establishment of a full session across 7 layers of the secondary protocol stack 381 consumes time.

The EPD 301, instead of going for re-establishment of the full session via the secondary protocol stack 381, continues to run the Internet telephony application on the application layer or layer 7, 303 of the primary protocol stack 371. The EPD 301 establishes a bridge 351 between layer 4, 309 of the primary protocol stack 371 and layer 4, 335 of the secondary protocol stack 381, i.e., communicatively couples layers 4 of the primary protocol stack 371 with the secondary protocol stack 381. The EPD 301 next establishes a full duplex path via the bridge 351. The full duplex path comprises layer 6, 305, layer 5, 307 and layer 4, 309 of the primary protocol stack 371, the bridge 351 and layer 4, 335, layer 3, 337, layer 2, 339 and layer 1, 341 of the secondary protocol stack 381. The layer 1 of the secondary protocol stack 381 is the secondary radio 341. Data packets generated by the Internet telephony application travel through the full duplex path. Data packets received by the EPD 301 via the secondary radio 341 and destined for the Internet telephony application 303 travel to the Internet telephony application 303 via the established full-duplex path.

The data packets traveling between the Internet telephony application 303 and the secondary radio 341 via the established full-duplex path are encoded/decoded as per the primary protocol and also as per the secondary protocol. Layers 7, 6, 5, 4 of the primary protocol stack 371 apply encoding/decoding to the data packets pursuant to the primary protocol. Layers 4, 3 and 2 of the secondary protocol stack 381 apply encoding/decoding to the data packets pursuant to the secondary protocol. The layer 4, 309 of the primary protocol stack 371 and layer 4, 335 of the secondary protocol stack 381 exchange information after the EPD 301 establishes the full-duplex path via the bridge 351. The information may typically contain encryption and/or decryption information and parameters corresponding to transport layer i.e., layer 4 of the primary protocol stack 371 and the secondary protocol stack 381. The information is necessary for supporting data flow via the established full-duplex path.

The EPD 301 hence continues to run the Internet telephony application on the layer 7, 303 of the primary protocol stack 371 while connects to the another EPD via the secondary radio 341 i.e., via the secondary pathway. The EPD 301 may choose to keep layers 5, 6 and 7 of the secondary protocol stack 381 unaware of the establishment of the bridge 351 between layers 4 and subsequent establishment of the full-duplex path via the bridge 351 for flow of data between the communication application (i.e., the Internet telephony application) and the secondary radio 341.

In another embodiment the EPD 301 chooses to send and/or receive data packets corresponding to the Internet telephony application 303 via the primary radio 315, i.e., via all layers of the primary protocol stack 371, and send and/or receives command data corresponding to the Internet telephony application 303 via the established full-duplex path via the bridge 351.

The EPD 301 is adapted to establish a bridge between any two layers, excluding layer 7 and layer 1, of the primary protocol stack 371 and the secondary protocol stack 381. The primary protocol and the secondary protocol may be communicatively incompatible. The primary protocol and the secondary protocol in this example are packet-switched data protocols. In yet another embodiment the primary protocol and the secondary protocol may be a combination of a packet-switched data protocol and a circuit-switched data protocol.

Figure 4:
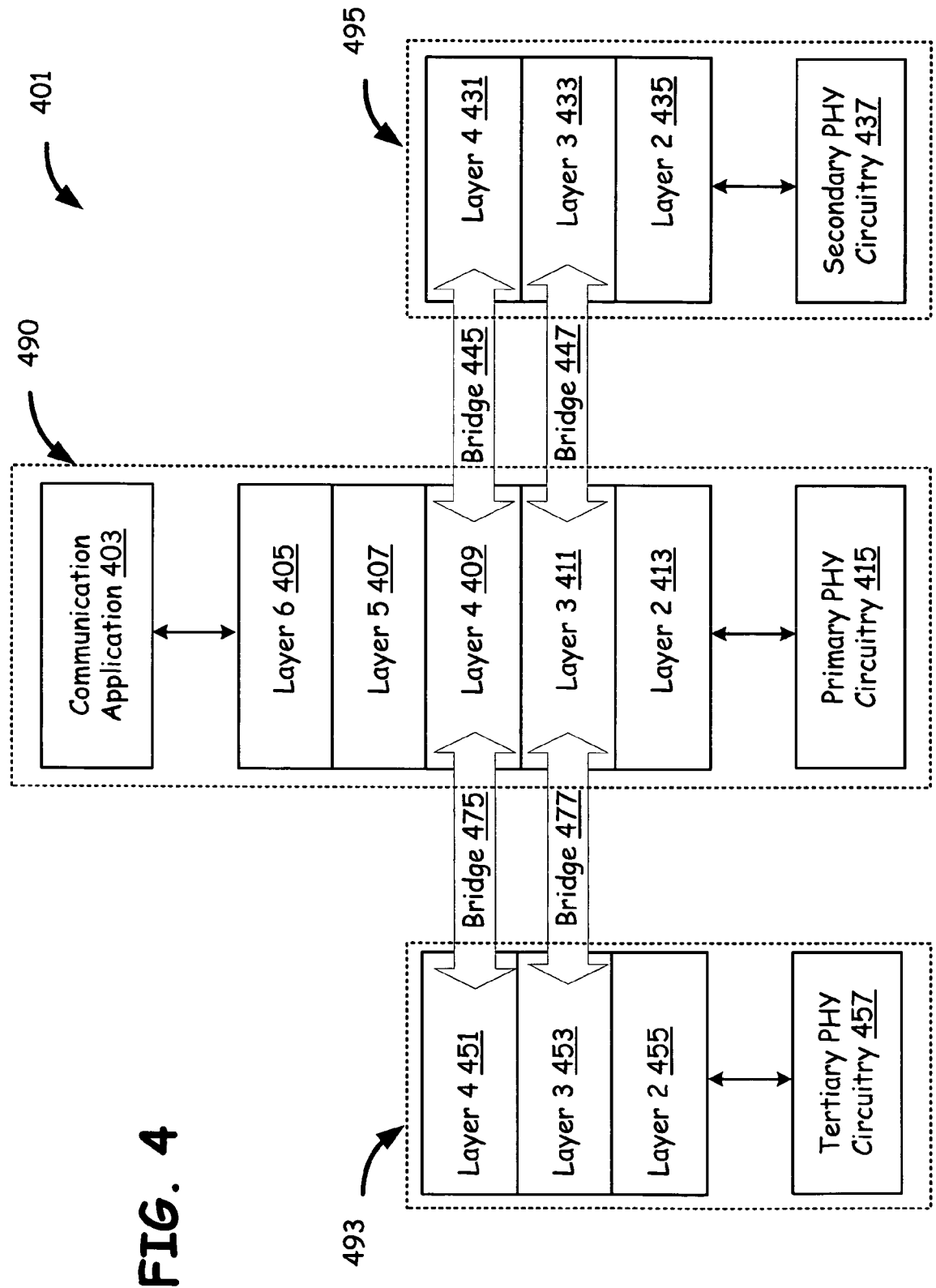
FIG. 4 is a schematic block diagram illustrating an end point device of FIG. 1, the end point device supporting full-duplex bridging among a primary protocol stack supporting a primary physical layer circuitry, a secondary protocol sub-stack supporting a secondary physical layer circuitry and a tertiary protocol sub-stack supporting a tertiary physical layer circuitry.

FIG. 4 is a schematic block diagram illustrating an end point device of FIG. 1, the end point device 401 supporting full-duplex bridging among a primary protocol stack 490 supporting a primary physical layer circuitry 415, a secondary protocol sub-stack 495 supporting a secondary physical layer circuitry 437 and a tertiary protocol sub-stack 493 supporting a tertiary physical layer circuitry 457. The EPD 401 comprises the primary physical layer circuitry 415, the secondary physical layer circuitry 437, and the tertiary physical layer circuitry 457. These physical layer circuitries are transceivers or radios that are adapted to send and receive data from nodes, such as access points, routers, bridges, EPDs etc. The primary physical layer circuitry 415 operates pursuant to the primary protocol. The secondary physical layer circuitry 437 and the tertiary physical layer circuitry 457 support the second protocol and the third protocol respectively. A communication application runs on the EPD 401. The EPD 401 communicates with a second EPD (not shown here) on which another instance of the communication application is running. As a way of example and without limitation, the EPD 401 is a notebook, the communication application is a web browsing application, and the second EPD is a web server. The EPD 401, having three physical layers, is adapted to establish up to three communication pathways to the second EPD. The three communication pathways are referred to as primary pathway, secondary pathway and tertiary pathway that runs via the primary physical layer circuitry 415, the secondary physical layer circuitry 437, and the tertiary physical layer circuitry 457 respectively.

The primary protocol stack 490 implemented in the EPD 401 comprises a 7 layer protocol stack architecture. The EPD 401 implements the secondary protocol sub-stack 495 and the tertiary protocol sub-stack 493, i.e., the EPD 401 instead of implementing all 7 layers of the secondary protocol and all 7 layers of the tertiary protocol, implements only four layers, namely layer 1, layer 2, layer 3 and layer 4 of each of the secondary and the tertiary protocol stack architecture. Any communication application runs on layer 7 of a protocol stack. The EPD 401 implements only all 7 layers of the primary protocol stack 490 in its circuitry and hence the EPD 401 is capable of running only one communication application at a time. However the EPD 401 is adapted to support three pathways to the second EPD by virtue of its three physical layer circuitry, 415, 437, and 457.

The primary protocol stack 490 is called so because the EPD 401 establishes any communication application through the primary protocol stacks 490 by default. As a way of example the EPD 401 is running a web browsing application on layer 7, 403 of the primary protocol stack 490. Data generated and/or destined for the web browsing application 403 pass through all 7 layers, 403, 405, 407, 409, 411, 413 and 415, of the primary protocol stack 490 and reach the second EPD (not shown here) via the primary pathway. The EPD 401 measures and/or. collects information regarding delay, traffic load, supported data rate etc. on the primary pathway, the secondary pathway, and the tertiary pathway at regular intervals. The EPD 401 also collects status information corresponding to the primary, the secondary and the tertiary physical layer circuitry, 415, 437 and 457 at regular intervals. The EPD 401 at an instant of time, based on the collected information decides to switch communication from the primary pathway to, for example, and without limitation, to the tertiary pathway.

The EPD 401 establishes a full-duplex bridge 475 between layer 4, 409 of the primary protocol stack 490 and layer 4, 451 of the tertiary protocol stack 493 after deciding to switch communication from the primary pathway to the tertiary pathway. The EPD 401 subsequently directs passage of data between the web browsing application 403 (layer 7 of the primary protocol stack) and the tertiary physical circuitry 457 (layer 1 of the tertiary protocol sub-stack) via layer 6, 405, layer 5, 407 and layer 4, 409 of the primary protocol stack 490, the bridge 475 and layer 4, 451, layer 3, 453, and layer 2, 455 of the tertiary protocol sub-stack 493. Henceforth the web browsing application 403 running on the EPD 401 continues to exchange data with the second EPD (not shown here) via the tertiary physical circuitry 457 or the tertiary pathway. The data is encoded as per the primary protocol while it travel down layers 7, 6, 5 and 4 of the primary protocol stack 490 and is encoded as per the tertiary protocol while it travel down layers 4, 3, 2 and 1 of the tertiary protocol stack 493.

In another embodiment the EPD 401 establishes a full-duplex bridge 477 between layer 3, 411 of the primary protocol stack 490 and layer 3, 453 of the tertiary protocol stack 493 after deciding to switch communication from the primary pathway to the tertiary pathway. The EPD 401 subsequently directs passage of data between the web browsing application 403 (layer 7 of the primary protocol stack) and the tertiary physical circuitry 457 (layer 1 of the tertiary protocol sub-stack) via layer 6, 405, layer 5, 407, layer 4, 409 and layer 3, 411 of the primary protocol stack 490, the bridge 477 and layer 3, 453, and layer 2, 455 of the tertiary protocol sub-stack 493.

The EPD 401 decides which of bridges 475 and 477 to be invoked at the instant of time. The decision by the EPD 401 depends on information collected by the EPD 401 from the three physical layer circuitry and the three pathways. The EPD 401 is adapted to invoke only a single bridge between two protocol stacks at a time. The EPD 401 is further adapted to break the bridge 475 and invoke the bridge 477, if necessary. The EPD 401 is further adapted to establish bridge between layers 4 and layers 3 of the primary protocol stack 490 and the secondary protocol sub-stack 495, thereby supporting data communication between the web-browsing application 403 and the second EPD via the secondary pathway.

Figure 5:
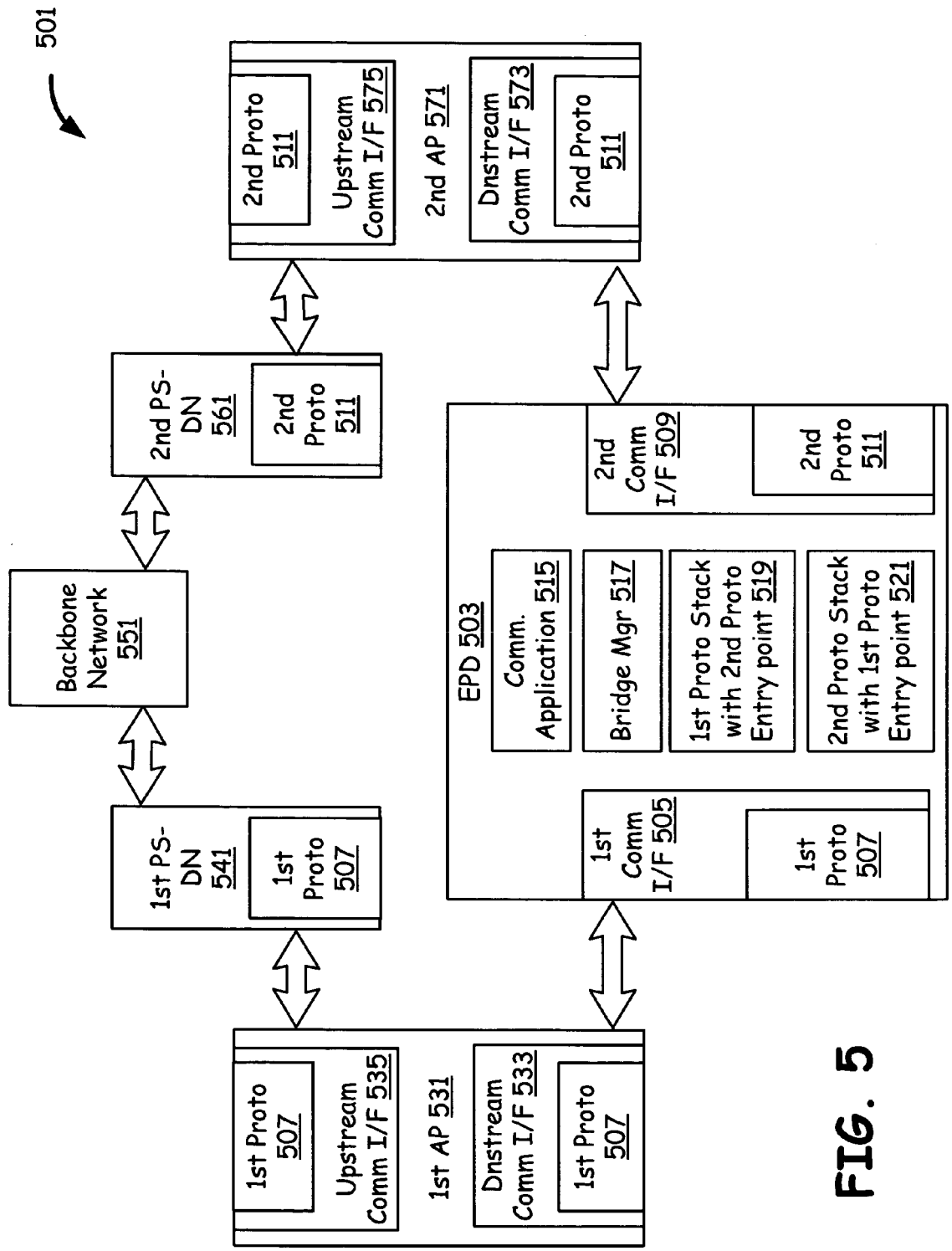
FIG. 5 is a schematic block diagram illustrating interaction of an end point device with a backbone network via a first pathway and a second pathway, the end point device having a bridge manager module that manages bridging between layers of a first protocol stack and layers of a second protocol stack to facilitate switching of a data communication session via the first pathway to that via the second pathway without reestablishment of the communication session.

FIG. 5 is a schematic block diagram illustrating interaction of an end point device 503 with a backbone network 551 via a first pathway and a second pathway, the end point device 503 having a bridge manager module 517 that manages bridging between layers of a first protocol stack 519 and layers of a second protocol stack 521 to facilitate switching of a data communication session via the first pathway to that via the second pathway without reestablishment of the communication session. The EPD 503 may be a phone, a notebook, a PDA, a PC, a video game box, a server, or any of a variety of client devices. The backbone network is communicatively coupled to a plurality of EPDs (not shown here). The EPD 503 thus is capable of exchanging data packets with the plurality of EPDs via the backbone network 551. The EPD 503 comprises a first communication interface 505 via which the EPD 503 is communicatively coupled to a downstream communication I/F 533 of a first AP 531. The first communication interface 505 operates pursuant to a first protocol that follows the first protocol stack architecture 519. The first AP 531 is further communicatively coupled to a first packet switched data network (PS-DN) 541 via its upstream communication interface 535. The first PS-DN 541 interacts with the backbone network 551. The EPD 503 is hence adapted to interact with the backbone network 551 via the first communication I/F 505 and using the first protocol. The first pathway from the EPD 503 to a second of the plurality of EPDs (not shown here) passes through the first AP 531, the first PS-DN 541 and the backbone network 551. Portion of the first pathway that runs between the EPD 503 and the backbone network 551 conform to the first protocol. Similarly the second pathway from the EPD 503 to the second of the plurality of EPDs (not shown here) passes through the second AP 571, the second PS-DN 561 and the backbone network 551. Portion of the second pathway that runs between the EPD 503 and the backbone network 551 conform to the second protocol.

The first protocol stack 519 comprises 7 layers where a communication application such as a video game, Internet telephony, a Web browsing application, a phone call, a file downloading application, a video streaming etc. runs on layer 7 of the first protocol stack 519. Layer 1 or physical layer of the first protocol stack 519 is the first communication I/F 505. Similarly the second protocol stack 521 comprises 7 layers where any communication application runs on layer 7 of the stack and the second communication I/F 509 is the layer 1 or physical layer (PHY) of the second protocol stack 521. As a way of example a video gaming application is running on the EPD 503. The EPD 503 interacts with the second of the plurality of EPDs via the backbone network 551 as long as the video gaming session continues. The second of the plurality of EPDs in this example may be a game server. The communication session here refers to the video gaming session between the EPD 503 and the second of the plurality of EPDs (not shown here). The EPD 503 is adapted to interact with the second of the plurality of EPDs i.e., the game server via the first pathway as well the second pathway. The video gaming session calls for full-duplex communication between the EPD 503 and the gaming server (not shown here).

The EPD 503 decides to use the first pathway for exchanging data packets with the gaming server. The EPD 503 sends and receives the data packets via the first communication I/F 505. The video gaming application 515 is running on the layer 7 of the first protocol stack 519. Different layers of the first protocol stack 519 encapsulate the data packets (generated by the video gaming application) as they travel down the first protocol stack 519 through layer 7 to layer 1, in conformity with the first protocol before sending them out of the layer 1 of the first protocol stack 519. Similarly encapsulated and/or encoded data packets that arrive at the first communication I/F 505 via the first pathway conform to the first protocol. These encapsulated and/or encoded data packets, as travel up the first protocol stack 519 through layer 1 to layer 7 i.e., the video gaming application, are decoded, and/or decrypted by the different layers of the first protocol stack 519.

The EPD 503 at an instant of time decides to use the second pathway for exchanging the data packets with the gaming server instead of the first pathway. The EPD 503 is prompted to take such a decision, for example, if the first communication I/F 505 goes to "sleep mode", traffic load on the first pathway exceeds a maximum limit, the second pathway supports a higher data rate at the instant of time, the second pathway provides a better QOS than the first pathway etc. Since the portion of the second pathway that runs between the EPD 503 and the backbone network 551 conforms to the second protocol, the video gaming session has to be re-established in the second protocol stack 521. The data packets generated by the video gaming application 515 are expected to be encoded and/or encrypted in conformity with the second protocol before being sent out of the second communication I/F 509.

A bridge manager module 517 in the EPD 503 establishes a bridge between one of the layers of the primary protocol stack 519 and a corresponding layer of the second protocol stack 521. The bridge manager module 517 further directs the data packets generated by and/or destined for the video gaming application 515 via the established bridge. As a way of example and without limitation, the bridge manager module 517 invokes the bridge between layer 4 of the first protocol stack 519 and layer 4 of the second protocol stack 521. Layer 4 is transport layer of 7-layer protocol stack architecture. Neither termination of the video gaming session through the primary protocol stack 519 nor reestablishment of the video gaming session through the second protocol stack 521 is performed. Instead, at least one session parameter is carried from the primary protocol stack 519 to the secondary protocol stack 521 via the established bridge. The at least one session parameter is typically an encryption parameter, a login parameter, a billing parameter, an association parameter etc. The data packets generated by the video gaming application 515 that is running on the layer 7 of the first protocol stack 519 travel down through layers 7, 6 and 5 of the first protocol stack 519 up to the layer 4 as directed by the bridge manager module 517. Next the data packets travel via the established bridge from the layer 4 of the first protocol stack 519 to the layer 4 of the second protocol stack 521. Next the data packets travel down through layer 3, layer 2 and layer 1 of the second protocol stack 521 before being sent out of the second communication interface 509. The data packets are encapsulated and/or encrypted as per the first protocol while they travel along layers of the first protocol stack 519. The data packets are further encapsulated and/or encrypted as per the second protocol while they travel along layers of the second protocol stack 521. Flow of the data packets generated by the video gaming application 515 is managed by the bridge manager module 517. The second protocol stack 521 with an entry point for the first protocol stack 519 in its layer 4 in this example saves the EPD 503 from re-establishment of the video gaming session through all layers of the second protocol stack 521 when the EPD 503 switches from the first pathway to the second pathway. The first communication I/F 505 is not in use as long as the EPD 503 conducts data exchange via the second pathway in this example. The second protocol stack 521 in another embodiment has multiple entry points for the first protocol stack 519, for example a first entry point in its layer 5, a second entry point in its layer 4 and a third entry point in its layer 3.

Similarly the bridge manager module 517 directs data packets that arrive at the second communication I/F 509 via the second pathway to travel up through layers 1, 2 3 and 4 of the second protocol stack 521. The received data packets are further directed to travel to layer 4 of the first protocol stack 519 via the established bridge. The received data packets next travel up layers 4, 5 and 6 of the first protocol stack 519 to reach the layer 7 i.e., the video gaming application 515. The first protocol stack 519 with an entry point for the second protocol stack 521 in its layer 4 in this example saves the EPD 503 from re-establishment of the video gaming session through all layers of the second protocol stack 521 even when the EPD 503 uses the second pathway instead of the first pathway to communicate with the gaming server (not shown here). The first protocol stack 519 in yet another embodiment has multiple entry points for the second protocol stack 521, for example a first entry point in its layer 4, a second entry point in its layer 3 and a third entry point in its layer 2.

The bridge manager module 517 in one embodiment decides to maintain interaction with the gaming server simultaneously via the first pathway as well the second pathway. The bridge manager module 517 directs data packets generated by and/or destined for the video gaming application 515 via the first pathway i.e., via the first communication I/F 505 and all layers of the first protocol stack 519. Additionally the bridge manager module 517 directs command packets that are regularly and/or occasionally generated by the video gaming application 515 and/or sent by the gaming server (not shown here) to the video gaming application 515 via the second pathway. The command packets are directed to travel via a few layers of the first protocol stack 519, the established bridge and a few layers of the second protocol stack 511. Layers from two protocol stack that get communicatively coupled with each other by way of the bridge establishment, i.e., layer 4 of the first protocol stack 519 and layer 4 of the second protocol stack 521 exchange information necessary to support packet data communication via two protocol substacks. For example, if layers 4 from two sides are participating then they may exchange information corresponding to TCP protocol, if layers 3 from the two sides are participating then they may exchange information corresponding to IP protocol, if layers 5 from the two sides are participating then they may exchange login information etc. The first protocol in another embodiment is communicatively incompatible with the second protocol. The first protocol and the second protocol are any of a variety of packet-switched data communication protocols.

Figure 6:
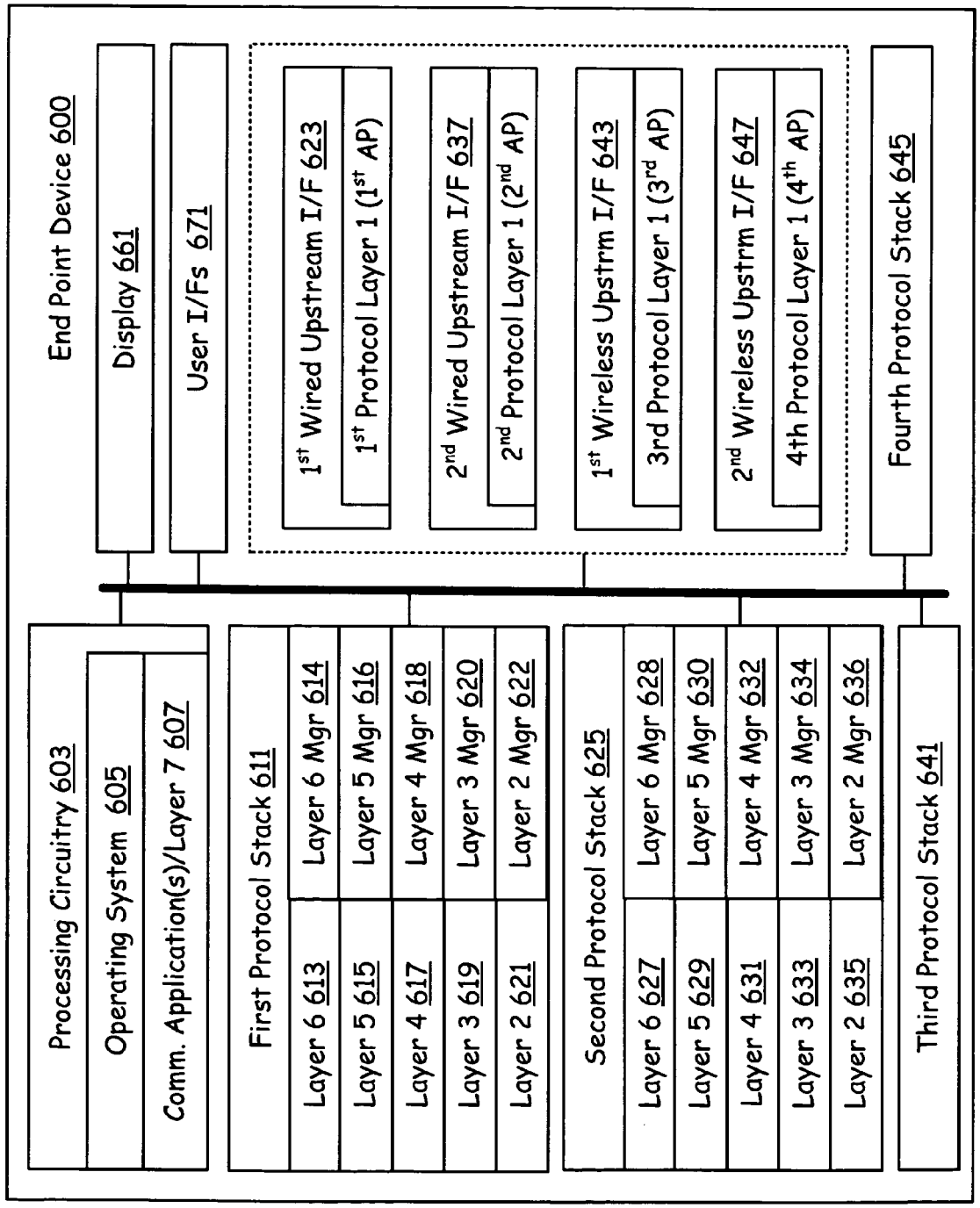
FIG. 6 is a schematic block diagram illustrating a plurality of components of an end point device that supports a plurality of data communication protocol stacks with each layer of a first of the protocol stacks independently managing bridging with a corresponding layer of a second of the protocol stacks.

FIG. 6 is a schematic block diagram illustrating a plurality of components of an end point device 600 that supports a plurality of data communication protocol stacks with each layer of a first of the protocol stacks independently managing bridging with a corresponding layer of a second of the protocol stacks. The EPD 600 which is typically a notebook, a PC, a PDA, a server, a video game box etc. comprises a display 671 and a user input interface 671. The user input I/F 671 is typically a plurality of buttons, a touch pad, a mouse, a joystick, a thumbwheel, a touch screen, a pen, a voice based interface etc. The EPD 600 is communicatively coupled to a first AP, a second AP, a third AP and a fourth AP respectively via a first wired upstream interface 623, a second wired upstream interface 637, a first wireless upstream interface 643 and a second wireless upstream interface 647. The EPD 600 is adapted to simultaneously support data communication with four different APs using four different communication protocols, two of them being wired protocols and remaining two being wireless protocols. The EPD 600 implements four different protocol stacks, each one of the four stacks responsible for data communication using the four different protocols. The four protocol stacks are a first protocol stack 611, a second protocol stack 625, a third protocol stack 641 and a fourth protocol stack 645. Each of the four protocol stacks, 611, 625, 641 and 645 comprise 7 layers. A communication application runs on highest layer i.e., application layer or layer 7 of each of the stacks 611, 625, 641 and 645. A communication I/F i.e., a radio constitutes lowest layer i.e., physical layer or layer 1 of each of the stacks 611, 625, 641 and 645. The first wired upstream interface 623 is layer 1 of the first protocol stack 611, the second wired upstream interface 637 is layer 1 of the second protocol stack 625, the first wireless upstream interface 643 is layer 1 of the third protocol stack 641 and the second wireless upstream interface 647 is layer 1 of the fourth protocol stack 645.

There is a layer manager associated with each of the layers 6 to layers 2 of each of the protocol stacks 611, 625, 641 and 645. Layers 7 on which communication applications run and layers 1 which are physical layers do not participate in bridge formation between protocol stacks. Layer 6 manager, 614 decides whether layer 6, 613 of the first protocol stack 611 will go for a bridge formation with layer 6 of the second protocol stack 625, or layer 6 of the third protocol stack 641 or layer 6 of the fourth protocol stack 645. In one embodiment, the layer 6 manager, 614 of the first protocol stack 611 and layer 6 manager, 628 of the second protocol stack 625 decide jointly whether a bridge is to be established between layer 6, 613 of the first protocol stack 611 and layer 6, 627 of the second protocol stack 625. Decision for invoking a bridge depends on information collected by associated layer manager from layer 1 and layer 2 of participating protocol stacks.

As a way of example and without limitation, the layer 6 manager, 614 of the first protocol stack 611 and layer 6 manager, 628 of the second protocol stack 625 collect information from layer 1 and layer 2 of the first protocol stack 611 and also from layer 1 and layer 2 of the second protocol stack 625. The layer 1, 623 of the first protocol stack 611 is communicatively coupled to the first AP via a first path. The layer 1, 637 of the second protocol stack 625 is communicatively coupled to the second AP via a second path. The collected information typically comprises loading, delay, interference level, current data transfer rate, maximum supported data rate on the first path and on the second path, status of the first wired upstream I/F 623, status of the second wired upstream I/F 637 etc. Based on the collected information, the layer 6 manager 614 and the layer 6 manager 628 jointly decide to transmit data packets, which were earlier transmitted to the first AP via the first path, to the second AP via the second path. Subsequently the layer 6 manager, 614 and the layer 6 manager, 628 jointly invoke a bridge between layer 6, 613 of the first protocol stack 611 and layer 6, 627 of the second protocol stack 625. The data packets generated by and/or destined for a communication application 607 pass through all layers of the first protocol stack 611 and transmitted and/or received by the first wired upstream I/F 623 prior to invoking the bridge. After invoking the bridge, the layer 6 manager, 614 and the layer 6 manager, 628 direct flow of the data packets between the communication application 607 and the second wired upstream I/F 623 via layer 6, 613 of the first protocol stack 611, the invoked bridge, layer 6, 627, layer 5, 629, layer 4, 631, layer 3, 633 and layer 2, 635 of the second protocol stack 625. The data packets earlier passing through the first wired upstream I/F 623 now pass through the second wired upstream I/F 637. The first wired upstream I/F 623 is associated with the first protocol stack 611 and the second wired upstream I/F 637 is associated with the second protocol stack 625. The data packets instead of passing through all layers of the second protocol stack 625, pass through a few of the layers of the second protocol stack 625 and a few of the layers of the first protocol stack 611 to reach the communication application that continues to run on layer 7 of the first protocol stack 611. Re-establishment of the communication session, that was till now going through the first protocol stack 611, through the second protocol stack 625 requires transfer of information from the first protocol stack 611 to the second protocol stack 625 thereby incurring delay. Bridging between two layers of the first protocol stack 611 and the second protocol stack 625 alleviates re-establishment of the communication session through all layers of the second protocol stack 625.

Figure 7:
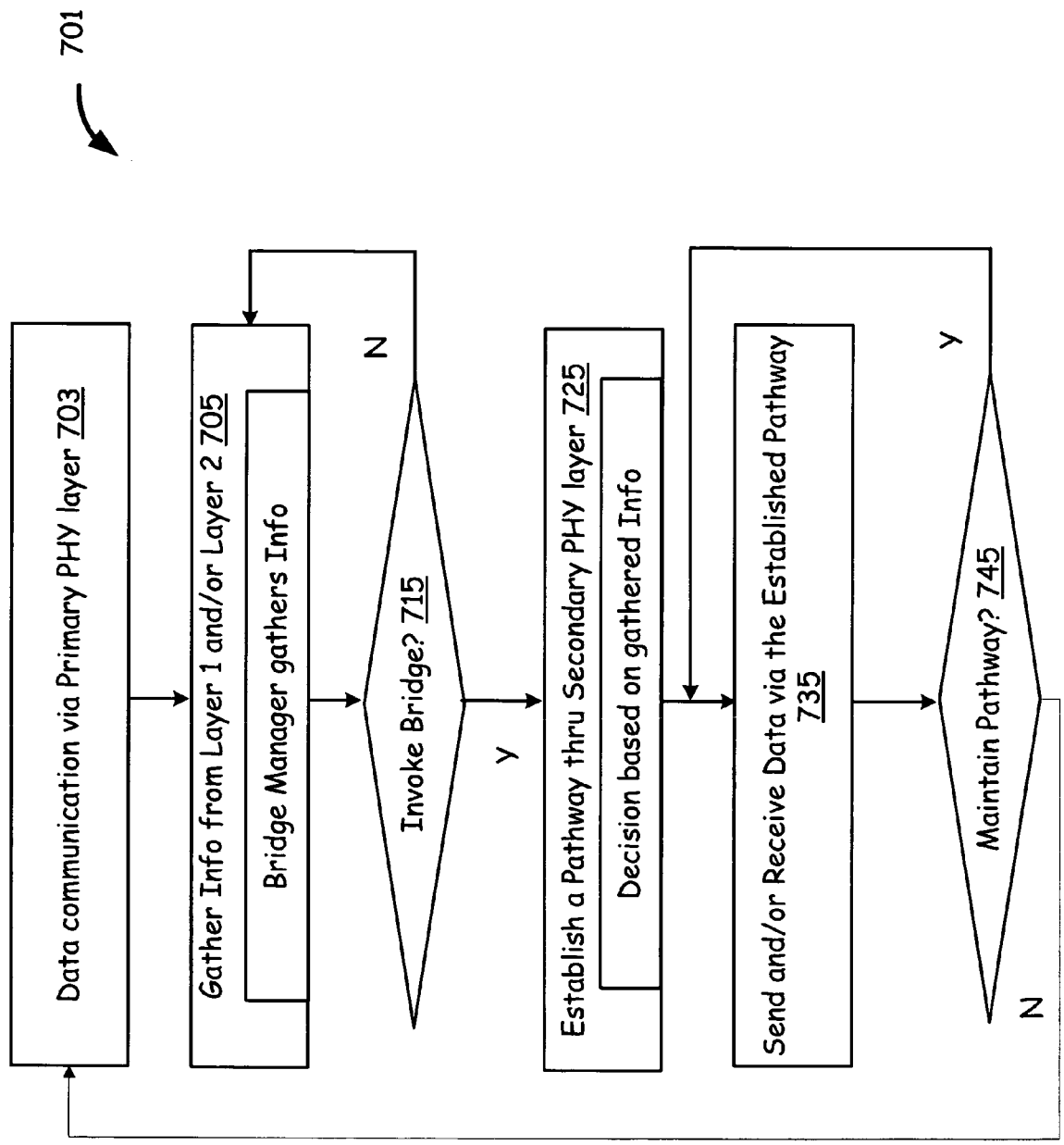
FIG. 7 is a flow chart illustrating a method of establishing a pathway via a secondary physical layer by invoking a bridge between two communicatively incompatible protocol stacks implemented in an end point device.

FIG. 7 is a flow chart illustrating a method of establishing a pathway via a secondary physical layer by invoking a bridge between two communicatively incompatible protocol stacks implemented in an end point device. A first of the two protocol stacks supports a primary physical layer and a second of the two protocol stacks supports a secondary physical layer. Layer 1 of any of the two protocol stacks refers to physical layer, i.e., layer 1 of the first of the two protocol stacks refers to the primary physical layer and layer 1 of the second of the two protocol stacks refers to the secondary physical layer. The EPD selects to transmit and receive data packets using the first of the two protocols, i.e., the EPD sends and receives the data packets via layer 1 of the first of the two protocol stacks by default as shown in a block 703. This prompts the layer 1 of the first of the two protocol stacks to be called the primary physical layer.

A bridge manager module implemented in the EPD (end point device) gathers information from layer 1 and layer 2 of the two protocol stacks implemented in the EPD in a next block 705. The information gathered by the bridge manager module in the block 705 tells the bridge manager module typically about delay, traffic load, link quality, device status, received signal strength etc. corresponding to the primary physical layer and the secondary physical layer. In a next block 715, the bridge manager module decided whether to invoke a bridge between the two protocol stacks. If the bridge manager module decides not to invoke the bridge then the method flow goes back to the block 705. The bridge manager module, as an example and without limitation, gathers the information at regular intervals.

The method flow goes to step 725 where the bridge manager module invokes the bridge between two corresponding layers of the two protocol stacks and thereby establishes a pathway from a communication application running on the EPD to the secondary physical layer without re-establishing the full communication session through all layers of the second of the two protocol stacks. The bridge manager module directs at least a session parameter corresponding to communication session till recently running through the first of the two protocol stacks to be carried to the second of the two protocol stacks via the bridge. Maintaining the at least a session parameter saves the EPD from termination of the communication session through all layers of the first of the two protocol stacks and subsequent reestablishment of the communication session fully through all layers of the second of the two protocol stacks. Invoking of the bridge refers to communicatively coupling the two corresponding layers and the two corresponding layers subsequently agreeing to receive data from the other one. In the block 725, the bridge manger module may choose to set up the bridge between session layers of the two protocol stacks, between transport layers of the two protocol stacks, between network layers of the two protocol stacks or between LLC layers of the two protocol stacks. The bridge manager module takes all such decisions based on the information gathered in the block 705. In one embodiment the bridge manager module may not have the liberty to choose the layers between which the bridge is to be established. For example, the EPD circuitry may be adapted to support bridging between only the transport layers of the two protocol stacks.

In the block 725, the bridge manager module establishes the pathway. The pathway comprises a few upper layers of the first of the two protocol stacks and a few lower layers of the bridge between the transport layers of the two protocol stacks then the pathway comprises application layer, presentation layer, session layer and the transport layer of the first of the two protocol stacks and the transport layer, network layer, data link layer and physical layer of the second of the two protocol stacks. The physical layer of the second of the two protocol stacks is the secondary physical layer. Thus in the block 725, the pathway from the communication application i.e., the application layer of the first of the two protocol stacks to the secondary physical layer is established by the bridge manager module.

In a block 735 the bridge manager module directs flow of the data packets, which were till now flowing via the primary physical layer, via the established pathway. The established pathway in one embodiment supports half-duplex data flow whereas in another embodiment supports full-duplex data flow. The bridge manager module monitors communication characteristics i.e., delay, traffic load, QOS etc. on the secondary physical layer to determine if the data packet flow through the established pathway via the secondary physical layer is to be continued, as shown in block 745. If at an instant of time the bridge manager module finds the established pathway unsuitable for continuation then the bridge manager module directs the data packets to flow via the primary physical layer i.e., via all layers of the first of the two protocol stacks as shown in the block 703.

Figure 8:
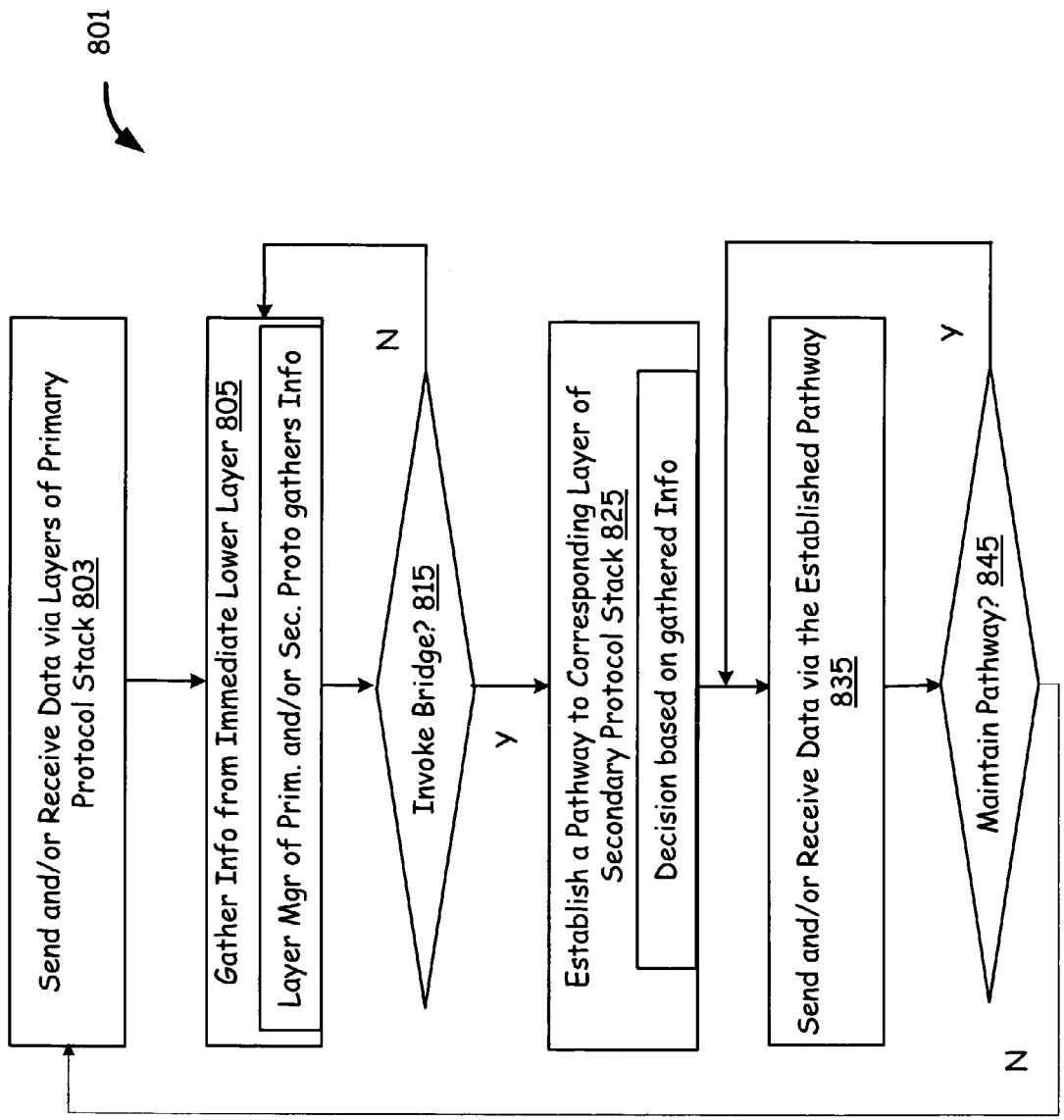
FIG. 8 is a flow chart illustrating a method of establishing a pathway via a secondary physical layer by invoking a bridge between two corresponding layers of two protocol stacks implemented in an end point device, wherein a plurality of layer managers invoke and manage the bridge.

FIG. 8 is a flow chart illustrating a method of establishing a pathway via a secondary physical layer by invoking a bridge between two corresponding layers of two protocol stacks implemented in an end point device, wherein a plurality of layer managers invoke and manage the bridge. A first of the two protocol stacks supports a primary physical layer and a second of the two protocol stacks supports a secondary physical layer. Layer 1 of any of the two protocol stacks refers to physical layer, i.e., layer 1 of the first of the two protocol stacks refers to the primary physical layer and layer 1 of the second of the two protocol stacks refers to the secondary physical layer. The end point device (EPD) selects to transmit and receive data packets using the first of the two protocols, i.e., the EPD sends and receives the data packets via the layer 1 of the first of the two protocol stacks by default as shown in a block 803. This prompts the layer 1 of the first of the two protocol stacks to be called the primary physical layer. The EPD selects to run any communication application on layer 7 or application layer of the first of the two protocol stacks. Any data packet generated by the communication application passes through all layers of the first of the two protocol stacks before being sent out by the primary physical layer i.e., the layer 1 of the first of the two protocol stacks as shown in the block 803. Similarly any data packet received by the EPD via the primary physical layer and destined for the communication application passes through all layers of the first of the two protocol stacks to reach the communication application. In one embodiment the two protocol stacks are communicatively incompatible. For example and without limitation, the first of the two protocol stacks follows WiMax protocol and the second of the two protocol stacks follows GPRS protocol.

The EPD implements the plurality of layer managers to decide, invoke, and maintain bridging between the two corresponding layers of the two protocol stacks. Each of the two protocol stacks follows a 7 layer architecture, i.e., each of the two protocol stacks comprises application layer, presentation layer, session layer, transport layer, network layer, data link layer, and physical layer. A first session layer manager corresponding to session layer of the first of the two protocol stacks and/or a second session layer manager corresponding to session layer of the second of the two protocol stacks gather information from immediate lower layer i.e., transport layer of the first of the two protocol stacks and transport layer of the second of the two protocol stacks respectively as shown in a block 805. The first session layer manager and/or the second session layer manager requires information about delay, traffic load, link quality, device status, received signal strength etc. corresponding to the primary physical layer and the secondary physical layer. Such information is typically available with the primary physical layer and the secondary physical layer. Such information, upon request from the first session layer manager and/or the second session layer manager travels up along protocol stack(s) to reach the first session layer manager and/or the second session layer manager.

In a next block 815, the first session layer manager and/or the second session layer manager decides whether to invoke a bridge between the two session layers of the two protocol stacks. If not, then the method flow goes back to the block 805. The first session layer manager and/or the second session layer manager, as an example and without limitation, gathers the information from immediate lower layers at regular intervals.

The step 805 and the step 815 are executed by each of the plurality of layer managers. In other words a first transport layer manager corresponding to transport layer of the first of the two protocol stacks and/or a second transport layer manager corresponding to transport layer of the second of the two protocol stacks gather information from immediate lower layers i.e., respective network layers and decide whether to invoke a bridge between transport layers of the two protocol stacks. Similar steps are executed by network layer managers and LLC layer managers. Only a single bridge can be invoked between two corresponding layers of the two protocol stacks at a time. So the session layer mangers, the transport layer managers, the network layer managers, and the LLC layer managers inform each other about their decisions.

The method flow goes to step 825 where the layer managers (either of the session layer mangers, the transport layer managers, the network layer managers, and the LLC layer managers) invoke the bridge between the two chosen layers of the two protocol stacks. The layer managers direct at least a session parameter corresponding to communication session to be carried to the second of the two protocol stacks via the invoked bridge. The at least a session parameter saves the EPD from terminating the communication session through all layers of the first of the two protocol stacks and subsequently reestablishing the communication session fully through all layers of the second of the two protocol stacks. The at least a session parameter is typically a login parameter, a billing parameter, an encryption parameter etc. The layer managers thereby establish a pathway from the communication application running on application layer of the first of the two protocol stacks to the secondary physical layer. Invoking of the bridge refers to communicatively coupling the two chosen layers and the two chosen layers subsequently agreeing to receive data from the other one. Decision taken by the layer managers is based on the information gathered in the block 805.

In the block 825, the bridge manager module establishes the pathway. If the LLC layer managers of the two protocols stacks set up the bridge between the LLC layers of the two protocol stacks the pathway comprises application layer, presentation layer, session layer, transport layer, network layer and LLC layer of the first of the two protocol stacks and the LLC layer, MAC layer and physical layer of the second of the two protocol stacks. Thus in the block 825, the pathway from the communication application to the secondary physical layer is established without re-establishing the communication session fully through all layers of the second of the two protocol stacks.

In a block 835 the participating layer managers i.e., the LLC layer managers in this example direct flow of the data packets, which were till now flowing via the primary physical layer, via the established pathway. The established pathway in one embodiment supports half-duplex data flow whereas in another embodiment supports full-duplex data flow. The LLC layer managers monitor communication characteristics i.e., delay, traffic load, QOS etc. on the secondary physical layer to determine if the data packet flow through the established pathway via the secondary physical layer is to be continued, as shown in block 845. If at an instant of time the LLC layer managers find the established pathway unsuitable then they direct the data packets to flow via the primary physical layer i.e., via all layers of the first of the two protocol stacks as shown in the block 803.

In yet another embodiment the LLC layer managers establish a half-duplex pathway. The LLC managers direct data packets generated by the communication application to travel via the established pathway before flowing out of the secondary physical layer. The LLC layer managers simultaneously receive another plurality of data packets destined for the communication application via the primary physical layer and direct them to travel up via all layers of the first of the two protocol stacks.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An end point device that selectively communicates with a first access point and a second access point, the first access point managing communications using a first protocol, the second access point managing communications using a second protocol, the first protocol being communicatively incompatible with the second protocol, the end point device comprising:
   a primary protocol stack comprising at least a first application layer, a first intermediate layer and a first physical layer, the first physical layer supporting packet data communication with the first access point using the first protocol;
   a secondary protocol stack comprising at least a second intermediate layer and a second physical layer, the second physical layer supporting packet data communication with the second access point using the second protocol;
   the first application layer of the primary protocol stack establishing a communication session via a first communication pathway that flows between the first application layer to the first access point and through the first intermediate layer and the first physical layer, the communication session having at least one session parameter identified during the establishment of the communication session; and
   a processing circuitry, in response to a change in a communication characteristic, reroutes the communication flow by providing a bridge between the first intermediate layer and the second intermediate layer to establish a second communication pathway between the first application layer and the second access point via the first intermediate layer, the second intermediate layer and the second physical layer while maintaining the at least one session parameter.

2. The end point device of claim 1, wherein the rerouting occurs without assistance from the first application layer.

3. The end point device of claim 1, wherein the change in the communication characteristic indicates that the second communication pathway is estimated to have, at least temporarily, a corresponding communication characteristic of a higher quality than the communication characteristic.

4. The end point device of claim 1, wherein the first intermediate layer comprising a plurality of middle layers, and the processing circuitry selects a first of the plurality of middle layers from which the bridge is established with the second intermediate layer.

5. The end point device of claim 1, wherein the at least one session parameter comprising an encryption parameter.

6. The end point device of claim 1, wherein the rerouting by the processing circuitry does not require reestablishment of the communication session.

7. A protocol stack infrastructure used in a device that has both a first physical layer for communicating with a first access point and a second physical layer for communicating with a second access point, both the first access point device and the second access point device are communicatively coupled to a packet switched network, the protocol stack structure comprising:
   an application layer;
   a primary protocol stack structure comprising a primary intermediate layer that supports a primary communication pathway between the application layer and the first physical layer;
   a secondary protocol stack structure comprising a secondary intermediate layer communicatively coupled with the second physical layer;
   a bridge between the primary intermediate layer of the primary protocol stack structure and the secondary intermediate layer of the secondary protocol stack structure, the bridge supporting a secondary communication pathway between the application layer and the second physical layer via both the primary intermediate layer and the secondary intermediate layer; and
   a bridging manager that selectively enables the bridge to switch between the primary communication pathway and the secondary communication pathway.

8. The protocol stack infrastructure of claim 7, wherein the bridging manager enables the bridge in response to a significant change in performance of the primary communication pathway.

9. The protocol stack infrastructure of claim 7, wherein a communication session that uses at least one session parameter is established for the application layer via the primary communication pathway, and the at least one session parameter is maintained for the secondary communication pathway.

10. The protocol stack infrastructure of claim 9, wherein the at least one session parameter comprising an encryption parameter.

11. The protocol stack infrastructure of claim 9, wherein the at least one session parameter comprising a log in parameter.

12. The protocol stack infrastructure of claim 9, wherein the at least one session parameter comprising a billing parameter.

13. The protocol stack infrastructure of claim 9, wherein the at least one session parameter comprising an association parameter.

14. An end point device that selectively communicates with a first access point and a second access point, the first access point managing communications using a first protocol, the second access point managing communications using a second protocol, the first protocol being communicatively incompatible with the second protocol, the end point device comprising:
   a primary protocol stack comprising at least a first application layer, a first intermediate layer and a first physical layer, the first physical layer supporting packet data communication with the first access point using the first protocol;
   a secondary protocol stack comprising at least a second intermediate layer and a second physical layer, the second physical layer supporting packet data communication with the second access point using the second protocol;
   a bridge that communicatively couples the first intermediate layer with the second intermediate layer;
   a bridge manager that supports flow of a first packet data originating from the first application layer to the second physical layer via the first intermediate layer, the bridge and the second intermediate layer in response to a communication characteristic; and
   the bridge manager further supporting flow of a second packet data entering via the second physical layer to the first application layer via the second intermediate layer, the bridge and the first intermediate layer in response to the communication characteristic.

15. The end point device circuitry of claim 14, wherein the communication characteristic may be a loading factor of the first physical layer.

16. The end point device circuitry of claim 14, wherein the communication characteristic may be unacceptable communication flow through the first physical layer.

17. A protocol stack infrastructure used in a device supporting a communication application, the device having both first communication interface circuitry and second communication interface circuitry, the protocol stack infrastructure comprising:
- an application layer comprising the communication application;
- a first physical layer comprising the first communication interface circuitry;
- a plurality of first intermediate layers that together provide a first communication pathway between the application layer and the first physical layer, the communication application establishes communication through the first communication pathway, at least one parameter is generated as part of the establishing communication;
- a second physical layer comprising the second communication interface circuitry;
- at least one, second intermediate layer coupled to the second physical layer; and
- the at least one, second intermediate layer supporting a second communication pathway from the communication application to the second physical layer via at least one of the plurality of first intermediate layers and the at least one, second intermediate layer.

18. The protocol stack infrastructure of claim 17, wherein the plurality of first intermediate layers, the first physical layer and the application layer together comprise a first protocol stack.

19. The protocol stack infrastructure of claim 17, wherein the at least one, second intermediate layer is part of a second protocol stack.

20. The protocol stack infrastructure of claim 18, wherein the first protocol stack has a bridging entry point to support the second communication pathway.

21. The protocol stack infrastructure of claim 18, wherein the first protocol stack has multiple bridging entry points to support the second communication pathway.

22. A method performed by a device having a first wireless physical protocol stack layer and a second wireless physical protocol stack layer, the device having a communication application protocol stack layer, the method comprising:
- establishing a first data pathway between the communication application protocol stack layer and the first wireless physical protocol stack layer via a first intermediate protocol stack layer;
- exchanging via the first data pathway a parameter as part of the establishing the first data pathway;
- exchanging a first portion of data packets via the first data pathway; and
- establishing a second data pathway using the parameter, the second data pathway flowing between the communication application protocol stack layer and the second wireless physical protocol stack layer via a bridge between the first intermediate protocol stack layer and a second intermediate protocol stack layer coupled to the second wireless physical protocol stack layer.

23. The method of claim 22, further comprising detecting a significant change in at least one communication characteristic, and wherein the establishing a second data pathway occurs in response to such detection.

24. The method of claim 22, wherein the parameter comprising a session parameter.

25. The method of claim 22, wherein the bridge has multiple entry points.

* * * * *